United States Patent [19]

Lengnick

[11] 3,719,632

[45] March 6, 1973

[54] ROOM TEMPERATURE CURABLE ORGANOPOLYSILOXANES

[75] Inventor: Guenther Fritz Lengnick, Adrian, Mich.

[73] Assignee: Stauffer-Wacker Silicone Corporation, Adrian, Mich.

[22] Filed: Dec. 30, 1970

[21] Appl. No.: 103,007

[52] U.S. Cl........260/46.5 G, 117/123 D, 117/124 F, 117/135.1, 117/138.8 A, 117/148, 260/18 S, 260/37 SB, 260/46.5 E
[51] Int. Cl..............................................C08f 11/04
[58] Field of Search...........260/46.5 G, 46.5 E, 18 SI

[56] References Cited

UNITED STATES PATENTS

| | | | |
|---|---|---|---|
| 3,189,576 | 6/1965 | Sweet | 260/46.5 |
| 3,555,109 | 1/1971 | Getson | 260/825 |
| 3,560,244 | 2/1971 | Neuroth | 117/71 |

*Primary Examiner*—Donald E. Czaja
*Assistant Examiner*—Melvyn I. Marquis
*Attorney*—Marion D. Ford, Lloyd L. Mahone and Robert C. Sullivan

[57] ABSTRACT

The invention relates to siloxane cross-linking agents and to curable one-component organopolysiloxanes obtained from the reaction of the siloxane cross-linking agents and a hydroxyl-terminated organopolysiloxane to form a composition which is curable in ambient moisture.

4 Claims, No Drawings

ROOM TEMPERATURE CURABLE ORGANOPOLYSILOXANES

This invention relates to curable one-component organopolysiloxanes, particularly organopolysiloxanes which are activated in the presence of moisture and more particularly room temperature curable organopolysiloxanes which are obtained from the reaction of siloxane cross-linking agents and hydroxyl-terminated organopolysiloxanes.

Heretofore, it was known that certain fluid organopolysiloxanes, when exposed to atmospheric moisture at room temperature, are converted to an elastomeric state. The desirability of a room temperature curable system is well known; however, the conventional room temperature curable system involves two or more stable components which, when mixed together, rapidly cure to a solid workable state. In other words, the end-user was provided with a two-package system in which one component was added just prior to use. Although the two-package system is adequate in a number of applications, there are other applications where the two-package system is undesirable because of the lack of skilled workmen or because of equipment which is inadequate to carry out the necessary mixing operation. Consequently, there was a definite need in the industry for a one-package room temperature curable system which was provided by the introduction of linear polysiloxanes containing two or more acyloxy functional radicals. While these single component room temperature curable compositions have met with commercial success, it has been extremely difficult to adapt them to some circumstances where extended working times are desirable or necessary. Also, some of the single component room temperature curable compositions cure rapidly on the surface when exposed to moisture while the interior remains in an uncured state for a long period of time. In addition, in some commercial applications it is desirable to provide an organopolysiloxane elastomer in a single package which is resistant to compression, has greater solvent resistance, improved cross-linking and improved hardness. Heretofore, none of the organopolysiloxane compositions commercially available provide all of these desirable properties.

It is therefore an object of this invention to provide organopolysiloxane compositions which are curable at room temperature. Another object of this invention is to provide compositions which vary in working time without reducing the cross-linking ability of the polymers employed. Still another object of this invention is to provide organopolysiloxane compositions which will cure in deep sections free of voids. Still another object of this invention is to provide curable organopolysiloxane compositions having improved physical properties. A further object of this invention is to provide novel cross-linking agents which will react with hydroxyl-terminated organopolysiloxanes to form an elastomeric material. A still further object of this invention is to provide organopolysiloxane compositions which may be dispensed as a single package.

The foregoing objects and others which will become apparent from the following description are accomplished in accordance with this invention, generally speaking, by providing curable compositions comprising an organopolysiloxane of the general formula:

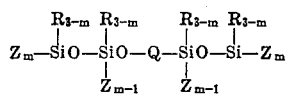

wherein the R(s) which may be the same or different represent monovalent hydrocarbon radicals, halogenated monovalent hydrocarbon radicals or cyanoalkyl radicals; Q represents a silicone radical of the formula:

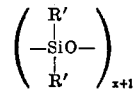

wherein the R'(s) which may be the same or different represent monovalent hydrocarbon radicals, halogenated monovalent hydrocarbon radicals or cyanoalkyl radicals; Z is a radical hydrolyzable by ambient moisture; $m$ is a number, each greater than 1 and $x$ is a number from 0 to 20,000.

The organopolysiloxanes of this invention may be prepared by reacting organodisiloxanes of the formula:

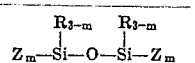

with an organopolysiloxane of the formula:

$$HO - Q - H$$

wherein R, Q, Z and $m$ are the same as those represented above.

The organic radicals represented by R and R' above are selected from the class consisting of alkyl radicals having from one to 18 carbon atoms such as methyl, propyl, butyl, hexyl, octyl, decyl, dodecyl, tetradecyl, octadecyl; aryl radicals such as phenyl, diphenyl, naphthyl and the like; alkaryl radicals such as tolyl, xylyl, ethylphenyl and the like; aralkyl radicals such as benzyl, phenylethyl and the like; haloaryl radicals such as chlorophenyl, tetrachlorophenyl, difluorophenyl and the like; alkenyl radicals such as vinyl, allyl and the like. Z represents groups which are hydrolyzable by ambient moisture such as

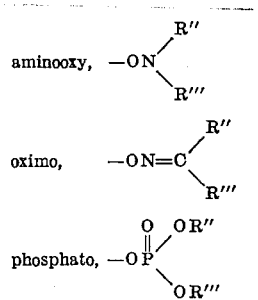

radicals, Radicals represented by R'' and R''' which may be the same or different are monovalent hydrocarbon radicals and halogenated monovalent hydrocarbon radicals. Suitable examples of these hydrolyzable groups are aminooxy radicals such as dimethylaminooxy, diethylaminooxy, dipropylaminooxy, dibutylaminooxy, dioctylaminooxy, diphenylaminooxy, ethylmethylaminooxy, methylphenylaminooxy, and the like. Suitable oximo radicals are acetophenoximo, acetoximo, benzophenoximo, 2-butanoximo, isopropylketoximo, chlorocyclohexanoximo, alpha-bromoacetophenoximo and the like. Examples of suitable phosphato groups are dimethylphosphato, diethylphosphato, dipropylphosphato, dibutylphosphato, dihexylphosphato, dioctylphosphato, didodecylphosphato, dioctadecylphosphato, methylethylphosphato, ethylpropylphosphato, methylhexylphosphato, butylhexylphosphato, methyldodecylphosphato, methyloctadecylphosphato, ethyltetradecylphosphato, diphenylphosphato, methylphenylphosphato, butylphenylphosphato and the like.

When the cross-linking agents of this invention are prepared by hydrolyzing or pyrolyzing organosilanes having two or more hydrolyzable groups at temperatures up to about 150°C., disiloxanes as well as mixtures and higher homologs of these disiloxanes are formed.

The disiloxane cross-linking agents may also be prepared by reacting organohalosilanes with compounds having any of the above described hydrolyzable groups to form corresponding compounds having groups which are hydrolyzable at ambient moisture. In other words, disiloxanes containing hydrolyzable groups may be obtained from the reaction of organohalosilanes with organic compounds containing the appropriate functional groups at a temperature of from about room temperature to 150°C., preferably from about 40° to 120°C. in the presence of a solvent which is inert to the reactants and the reaction product. Suitable solvents include aliphatic hydrocarbons such as pentane, hexane, heptane, octane; aromatic hydrocarbons such as benzene, toluene, xylene, naphthalene; as well as halogenated solvents such as methylene chloride, fluorobenzene and the like. Other solvents which may be used are organic ethers such as petroleum ether, diethyl ether, dibutyl ether and hydroxyl-free fluid siloxanes.

Where it is desirable to prepare disiloxanes having phosphato functional groups, the halogen-containing silanes may be reacted with phosphoric acid or an alkali metal salt or an alkaline earth metal salt of said acid in the presence of one of the inert organic solvents described above.

The conventional organopolysiloxanes described heretofore, may be prepared from difunctional organosilanes of the formula

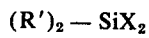

wherein the R'(s) which may be the same or different represent halogenated or unhalogenated aliphatic, alicyclic or aromatic hydrocarbon radicals such as methyl, ethyl, vinyl, allyl, cyclohexyl, cyclohexenyl, phenyl and tolyl and X represents hydrolyzable atoms or groups such as halogen atoms or alkoxy groups.

The organopolysiloxanes may be homopolymers as well as copolymers, that is, compounds derived from two or more different diorganosilanes and even the organic radicals linked to any particular silicon atom may be different organic radicals. Especially useful are the dimethylpolysiloxanes, methylphenylpolysiloxanes and the methylvinylpolysiloxanes.

The curable compositions of this invention may be prepared by reacting disiloxanes containing functional groups which are hydrolyzable by ambient moisture with the organopolysiloxanes at any convenient temperature, although in general, temperatures ranging from about 20° to 100°C. are sufficient. It should be understood, of course, that higher or lower temperatures may be employed if desired, although, preferably the reaction should be carried out at temperatures below about 200°C. The reaction may be carried out in the presence of an inert solvent, that is, a solvent which is unreactive with both the terminal hydroxyl groups on the organopolysiloxane or the functional groups on the disiloxanes. Solvents which may be used, if desired, include hydrocarbons such as benzene, toluene, and xylene; halogenated solvents such as ethylene chloride, perchloroethylene, chlorobenzene and the like; organic ethers such as diethyl ether, dibutyl ether or hydroxyl-free fluid siloxanes. The presence of solvents is particularly desirable where the hydroxyl-terminated polysiloxane has a high viscosity or in cases where the solvent reduces the overall viscosity of the mixture and facilitates the reaction.

The ratio of disiloxane cross-linking agent to organopolysiloxanes is not critical, however, it is preferred that at least one mole of the disiloxane cross-linking agent be used per moles of silicon-bonded hydroxyl group and more preferably from about 2 to 5 moles of the disiloxane be used per mole of silicon-bonded hydroxyl group on the organopolysiloxane. It is possible to use up to about 12 moles of disiloxane per mole of silicon-bonded hydroxyl group since a large excess of the disiloxane insures complete reaction with all of the silicon-bonded hydroxyl groups. It is preferred that the reaction be carried out in the absence of moisture, since the latter may interfere with the reaction. However, traces of moisture are not especially harmful if excess of the disiloxane cross-linking agent is employed.

The compositions of this invention may consist solely of the reaction product of an organopolysiloxane and a disiloxane cross-linking agent containing hydrolyzable groups. However, for modifying the consistency of the uncured composition or to reinforce the cured product for some other purpose, mineral fillers in the form of very fine powders may be added.

Examples of mineral fillers which may be used are various kinds of silicas, oxides of iron, zinc, cadmium, aluminum and carbonates. The proportion and type of filler employed will depend to a certain extent on the particular use to which the composition is to be applied. Silicas obtained by precipitation, for example, those sold under the tradenames SANTOCEL and HI-SIL and silicas obtained from combustion such as those sold under the tradename AEROSIL are particularly suitable for production of reinforced elastomeric products. These micro-fine silicas have a large absorptive surface and are effective even in small quantities. Fillers such as milled natural silicas and calcium carbonate can, on the other hand, be employed in large proportions, for example, 100 percent based on the weight of the organopolysiloxanes.

In addition to the fillers mentioned heretofore, compositions conforming to the invention may contain coloring agents, thixotropic agents, agents capable of preventing the passage of ultraviolet light, desiccants and antioxidants.

In addition to the constituents mentioned above, the compositions may contain, for the purpose of accelerating the curing rate, certain compounds which have a catalytic effect on the condensation reactions. Although several compounds are known to have a catalytic effect on the curing rate, organotin compounds were found to be desirable. Examples of suitable catalysts are the salts of organic acids such as tin naphthenate, tin-2-ethylhexanoate, tin benzoate, dibutyltin dilaurate, dibutyltin diacetate, bis(dibutyltin oleate)oxide, bis(dibutyltin) stearate)oxide, dibutyltin oleate hydroxide and the like. The catalyst may be used in an amount from about 0.001 to about 1 percent, preferably from about 0.2 to about 0.5 percent based on the weight of the organopolysiloxanes.

The curable composition may be prepared by mixing liquid hydroxyl-terminated organopolysiloxanes and a filler in any conventional mixing apparatus such as a Sigma Blade Mixer, roller mill, Banbury Mixer and the like, and thereafter heating the mixture for a sufficient time to eliminate all traces of moisture. The mass is cooled and the disiloxane cross-linking agent containing hydrolyzable groups is added and if desired, a catalyst and an anhydrous organic diluent. The composition may be used immediately or it may be transferred under anhydrous conditions to dry containers which are hermetically sealed. The products thus prepared may be kept several months and even years.

The compositions may be cured by merely exposing them to atmospheric moisture without any additional water vapor. Upon exposure to moisture, the compositions cure in from a few minutes to several hours or days depending upon the type of groups present on the cross-linking agent. In general, an increase in molecular weight of any of the groups will increase the time of cure.

The products of this invention adhere to a variety of materials such as, for example, wood, metal, glass, ceramics, plastics and the like. In the case of substrates having poor adhesion properties, it may be desirable to apply an appropriate pre-treatment to the surface before applying the compositions of this invention. These self-curing compositions may also serve as caulking compounds, as coverings for various articles such as electrical equipment, as coatings for glass, metals, fabrics, for protecting various supports and for producing films and molded articles. They may be applied by any of the usual techniques such as by dipping, doctoring or spraying.

Various aspects of the invention are further illustrated by the following examples which are not to be taken as in any way limiting the scope thereof. In the examples, all parts are by weight unless otherwise specified.

EXAMPLE 1

To a reactor equipped with a reflux condenser, addition funnel and agitator are added about 66.9 parts of propyltris(N,N-diethylaminooxy)silane in about 100 parts of dioxane. About 1.8 parts of water in about 10 parts of dioxane are added dropwise to the reactor. The reactants are heated and refluxed for about 1 hour and the volatile materials and solvent are removed in vacuo (1 mm. Hg). A residual product is recovered which by infrared analysis has an Si—O—Si linkage and is identified as 1,3-dipropyl-1,1,3,3-tetrakis(N,N-diethylaminooxy)-1,3-disiloxane.

EXAMPLE 2

In accordance with the procedure described in Example 1, about 1.8 parts of water in about 10 parts of dioxane are added dropwise to about 61.5 parts of methyltris(N,N-diethylaminooxy)-silane. A residual product is recovered which contains Si—O—Si linkages and is identified as 1,3-dimethyl-1,1,3,3-tetrakis(N,N-diethylaminooxy)-1,3-disiloxane.

EXAMPLE 3

In accordance with the procedure described in Example 1, about 162 parts of methyltris(N,N-dioctylaminooxy)silane in about 200 parts of dioxane are reacted with about 1.8 parts of water in about 10 parts of dioxane. A residual product is recovered which shows the presence of Si—O—Si linkages and is identified as 1,3-dimethyl-1,1,3,3-tetrakis(N,N-dioctylaminooxy)-1,3-disiloxane.

EXAMPLE 4

In accordance with the procedure described in Example 1, about 1.8 parts of water in about 2 parts of dioxane are added dropwise to about 78.3 parts of methyltris(N-butyl-N-ethylaminooxy)-silane. A residual product is recovered which by infrared analysis shows Si—O—Si linkages and is identified as 1,3-dimethyl-1,1,3,3-tetrakis(N-butyl-N-ethylaminooxy)-1,3-disiloxane.

EXAMPLE 5

About 1.8 parts of water in about 2 parts of dioxane are added dropwise to about 48.9 parts of tetrakis(N,N-dimethyl-aminooxy)silane in about 200 parts of dioxane in accordance with the procedure described in Example 1. A residual product is recovered which by infrared analysis shows the presence of Si—O—Si linkages and is identified as 1,1,1,3,3,3-hexakis(N,N-dimethylaminooxy)-1,3-disiloxane.

EXAMPLE 6

About 1.8 parts of water in about 10 parts of dioxane are added to about 64.2 parts of butyltris(N,N-diethylaminooxy)-silane in about 200 parts of dioxane in accordance with the procedure described in Example 1. A residual product is recovered which by infrared analysis shows the presence of Si—O—Si linkages and is identified as 1,3-dibutyl-1,1,3,3-tetrakis(N,N-diethylaminooxy)-1,3-disiloxane.

EXAMPLE 7

About 1.8 parts of water in about 10 parts of dioxane are added to about 52 parts of methyltris(acetoximo)silane in about 200 parts of dioxane in accordance with the procedure described in Example 1. A residual product is recovered which by infrared analysis shows the presence of Si—O—Si linkages and is identified as 1,3-dimethyl-1,1,3,3-tetrakis(acetoximo)-1,3-disiloxane.

EXAMPLE 8

About 1.8 parts of water in about 10 parts of dioxane are added dropwise to about 60 parts of butyltris(acetoximo)silane in about 150 parts of dioxane. A residual product is recovered which by infrared analysis shows the presence of Si—O—Si linkages and is identified as 1,3-dibutyl-1,1,3,3-tetrakis(acetoximo)-1,3-disiloxane.

EXAMPLE 9

About 1.8 parts of water in about 10 parts of dioxane are added to about 89 parts of methyltris(acetophenoximo)silane in about 150 parts of dioxane in accordance with the procedure described in Example 1. A residual product is recovered which by infrared analysis shows the presence of Si—O—Si linkages and is identified as 1,3-dimethyl-1,1,3,3-tetrakis(acetophenoximo)-1,3-disiloxane.

EXAMPLE 10

About 1.8 parts of water in about 10 parts of dioxane are added dropwise to about 126 parts of methyltris(benzophenoximo)silane in accordance with the procedure described in Example 1. A residual product is recovered which by infrared analysis shows the presence of Si—O—Si linkages and is identified as 1,3-dimethyl-1,1,3,3-tetrakis(benzophenoximo)-1,3-disiloxane.

EXAMPLE 11

About 1.8 parts of water in about 10 parts of dioxane are added to about 60 parts of methyltris(butyraldoximo)silane in about 160 parts of dioxane in accordance with the procedure described in Example 1. A residual product is recovered which by infrared analysis shows the presence of Si—O—Si linkages and is identified as 1,3-dimethyl-1,1,3,3-tetrakis(butyraldoximo)-1,3-disiloxane.

EXAMPLE 12

About 1.8 parts of water in about 10 parts of dioxane are added to about 77 parts of methyltris(hexanoximo)silane in about 140 parts of dioxane in accordance with the procedure described in Example 1. A residual product is recovered which by infrared analysis shows the presence of Si—O—Si linkages and is identified as 1,3-dimethyl-1,1,3,3-tetrakis(hexanoximo)-1,3-disiloxane.

EXAMPLE 13

About 1.8 parts of water in about 10 parts of dioxane are added dropwise to about 60 parts of methyltris(methylethylketoximo)-silane in about 150 parts of dioxane in accordance with the procedure described in Example 1. A residual product is recovered which by infrared analysis shows the presence of Si—O—Si linkages and is identified as 1,3-dimethyl-1,1,3,3-tetrakis(methylethylketoximo)-1,3-disiloxane.

EXAMPLE 14

To a reactor are added about 202 parts of propyltris-(acetoximo)silane in the presence of a nitrogen atmosphere. The reactor is evacuated and the reaction mass heated to about 150°C. for about 4 hours and then cooled to room temperature. The volatile materials are removed under vacuum and the residual product is dissolved in dioxane. The dioxane is removed in vacuo (1 mm. Hg) and the residual product is analyzed. Infrared analysis shows the presence of Si—O—Si linkages and the product is identified as 1,3-dimethyl-1,1,3,3-tetrakis(acetoximo)-1,3-disiloxane.

EXAMPLE 15

In accordance with the procedure described in Example 14, 259 parts of methyltris(acetoximo)silane are heated in a reactor for about 5 hours at a temperature of about 150°C. A residual product is recovered which by infrared analysis shows the presence of Si—O—Si linkages and is identified as 1,3-dimethyl-1,1,3,3-tetrakis(acetoximo)-1,3-disiloxane.

EXAMPLE 16

To a reactor equipped with a reflux condenser, agitator and dropping funnel are added about 100 parts of methyltris(diethylphosphato)silane in about 150 parts of dioxane. About 1.8 parts of water in about 10 parts of dioxane are added dropwise to the reactor. The reactants are heated in reflux for about 1 hour after which time the volatile materials and solvent are removed in vacuo (1 mm. Hg). A residual product is recovered which by infrared analysis shows the presence of Si—O—Si linkages and is identified as 1,3-dimethyl-1,1,3,3-tetrakis(diethylphosphato)-1,3disiloxane.

EXAMPLE 17

About 1.8 parts of water in about 10 parts of dioxane are added to a reactor containing about 108 parts of butyltris-(diethylphosphato)silane in about 300 parts of dioxane in accordance with the procedure described in Example 16. The volatile materials and solvent are removed in vacuo (1 mm. Hg. or less). The residual product shows the presence of Si—O—Si linkages by infrared analysis and is identified as 1,3-dibutyl-1,1,3,3-tetrakis(diethylphosphato)-1,3-disiloxane.

EXAMPLE 18

About 1.8 parts of water in about 10 parts of dioxane are added dropwise to about 83.7 parts of methyltris(dimethylphosphato)-silane in about 180 parts of dioxane. A residual product is recovered which by infrared analysis shows the presence of Si—O—Si linkages and is identified as 1,3-dimethyl-1,1,3,3-tetrakis(dimethylphosphato)-1,3-disiloxane.

EXAMPLE 19

About 1.8 parts of water in about 10 parts of dioxane are added dropwise to a reactor containing about 158 parts of methyltris(diphenylphosphato)silane in about 250 parts of dioxane in accordance with the procedure described in Example 16. After refluxing the reactants for a period of 1.8 hours, the volatile materials and solvent are removed in vacuo (1 mm. Hg). Infrared analysis of the residual product shows the presence of Si—O—Si linkages and is further identified as 1,3-dimethyl-1,1,3,3-tetrakis(diphenylphosphato)-1,3-disiloxane.

EXAMPLE 20

To a reactor containing approximately 298 parts of methyltrichlorosilane and maintained under an atmosphere of nitrogen at a temperature of −10°C. are added dropwise about 18 parts of water with agitation. After about 0.5 hours, the volatile product is removed in vacuo (1 mm. Hg or less). It is identified as 1,3-dimethyl-1,1,3,3-tetrachloro-1,3-disiloxane.

To a reactor containing about 24 parts of the siloxane prepared above in about 100 parts of dry heptane are added about 71 parts of N,N-diethylhydroxylamine in about 150 parts of dry heptane and the mixture is heated to reflux temperature for about 1 hour. A precipitate is formed which is removed by filtration and identified as N,N-diethylhydroxylamine hydrochloride. The heptane solvent and excess N,N-diethylhydroxylamine are removed in vacuo yielding a residual product which is identified as 1,3-dimethyl-1,1,3,3-tetrakis(diethylaminooxy)-1,3-disiloxane.

EXAMPLE 21

About 29 parts of acetoxime dissolved in about 150 parts of ethyl ether are added dropwise with agitation to a reactor containing about 24 parts of the chlorosiloxane prepared in Example 20 dissolved in about 150 parts of toluene and containing about 32 parts of pyridine. As the exothermic reaction progresses, small increments of toluene are added to disperse the large volume of pyridine hydrochloride formed. After the reaction is complete, the reaction mass is cooled to room temperature and the product mixture filtered and stripped of toluene and excess pyridine. A residual product is recovered which is identified as 1,3-dimethyl-1,1,3,3-tetrakis(acetoximo)-1,3-disiloxane.

EXAMPLE 22

To a reactor containing about 24 parts of the chlorosiloxane prepared in Example 20 dissolved in about 500 parts of benzene are added about 62 parts of diethylhydrogenphosphate in about 100 parts of benzene. The reactants are heated to reflux temperature for about 1 hour with agitation, followed by the passage of nitrogen through the solution for approximately 4 hours. The solvent and volatile materials are removed under vacuum distillation, yielding a residual product which is identified as 1,3-dimethyl-1,1,3,3-tetrakis(diethylphosphato)-1,3-disiloxane.

EXAMPLES 23 to 41

A reactor containing a hydroxyl-terminated organopolysiloxane is evacuated for about 10 minutes. The cross-linking agents prepared in accordance with the procedures described in Examples 1 through 19 are each added to hydroxyl-terminated organopolysiloxanes containing about 10 parts of chloroform and heated to a temperature of about 80°C. with agitation. After about 1 hour, the volatile materials are removed by vacuum distillation and the residual product placed in a mold and allowed to cure at room temperature. These compositions cured to a tack-free condition in a period of time ranging from about 0.2 to about 25 hours. The results of these experiments are illustrated in Table I.

TABLE I

| example No. | cross-linking Agent | | dimethylpolysiloxane Fluid | catalyst | | tack-Free Time |
|---|---|---|---|---|---|---|
| | ex. no. | parts | parts cs. | Type | Parts | Hour |
| 23 | 1 | 3.1 | 30  400 | — | — | 0.2 |
| 24 | 2 | 3.3 | 31  400 | — | — | 0.2 |
| 25 | 3 | 3.2 | 31  2,000 | — | — | 0.9 |
| 26 | 4 | 3.6 | 33  1,000 | — | — | 0.5 |
| 27 | 5 | 3.5 | 32  800 | — | — | 0.1 |
| 28 | 6 | 3.2 | 31  10,000 | — | — | 0.2 |
| 29 | 7 | 2.9 | 30  800 | DBTD | 0.10 | 0.8 |
| 30 | 8 | 3.5 | 32  1,000 | DBTBC | 0.05 | 0.7 |
| 31 | 9 | 3.6 | 33  400 | TO | 0.05 | 0.3 |
| 32 | 10 | 3.4 | 32  1,400 | b(DBT)O | 0.05 | 4.0 |
| 33 | 11 | 3.3 | 33  1,200 | — | — | 24.0 |
| 34 | 12 | 3.1 | 30  800 | TO | 0.10 | 1.5 |
| 35 | 13 | 3.4 | 32  400 | DBTBC | 0.10 | 0.5 |
| 36 | 14 | 3.7 | 34  1,200 | — | — | 7.0 |
| 37 | 15 | 3.5 | 33  2,000 | DBTD | 0.10 | 1.0 |
| 38 | 16 | 3.2 | 32  1,000 | — | — | 8.0 |
| 39 | 17 | 3.1 | 30  400 | DBTD | 0.20 | 0.9 |
| 40 | 18 | 3.0 | 31  800 | DBTD | 0.20 | 0.6 |
| 41 | 19 | 3.1 | 31  400 | TO | 0.05 | 0.3 | b(DBT)O = bis(dibutylhydroxytin)oxide
DBTBC = dibutyltin butoxychloride
DBTD = dibutyltin dilaurate
TO = tin octoate When the above examples are repeated utilizing other cross-linking agents with other organopolysiloxanes, elastomeric materials are obtained which have properties and curing times substantially equivalent to those of the specified examples.

Although specific examples of the invention have been described herein, other variations and modifications falling within the spirit and scope of the appended claims are to be included therein.

The invention claimed is:

1. A composition stable under anhydrous conditions which is curable to a solid, elastomeric state when exposed to atmospheric moisture having the formula:

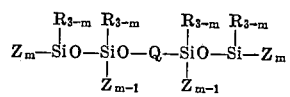

wherein Q is a radical of the formula:

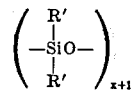

R and R' are selected from the group consisting of alkyl radicals having from one to 18 carbon atoms, aryl radicals, alkaryl radicals, aralkyl radicals, alkenyl radicals, haloaryl radicals and cyanoalkyl radicals; Z is a hydrolyzable group selected from the class consisting of aminooxy radicals, oximo radicals and phosphato radicals; $m$ is a number greater than 1 and up to 3 and $x$ is an integer of from 0 to 20,000.

2. The composition of claim 1 wherein Z is an oximo radical.

3. The composition of claim 1 wherein Z is an aminooxy radical.

4. The composition of claim 1 wherein Z is a phosphato radical.

* * * * *